(12) United States Patent
Gallucci et al.

(10) Patent No.: US 9,045,640 B2
(45) Date of Patent: Jun. 2, 2015

(54) BLENDS OF POLYPHENYLENE ETHER SULFONE AND SILICONE POLYESTER CARBONATE

(71) Applicant: SABIC Innovative Plastics IP B.V., Bergen op Zoom (NL)

(72) Inventors: Robert Russell Gallucci, Mt. Vernon, IN (US); Paul Dean Sybert, Evansville, IN (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 14/047,508

(22) Filed: Oct. 7, 2013

(65) Prior Publication Data

US 2014/0039103 A1 Feb. 6, 2014

Related U.S. Application Data

(63) Continuation of application No. 13/315,507, filed on Dec. 9, 2011, now abandoned.

(51) Int. Cl.
| | |
|---|---|
| C08L 83/04 | (2006.01) |
| C08K 5/55 | (2006.01) |
| C08K 3/38 | (2006.01) |
| C08F 283/08 | (2006.01) |
| C08L 73/00 | (2006.01) |
| C08G 18/67 | (2006.01) |
| C08L 51/00 | (2006.01) |
| C08L 69/00 | (2006.01) |
| C08G 75/02 | (2006.01) |
| C08L 81/00 | (2006.01) |
| C08F 283/00 | (2006.01) |
| C08G 63/08 | (2006.01) |
| C08L 81/06 | (2006.01) |
| C08L 27/18 | (2006.01) |
| C08L 71/08 | (2006.01) |

(52) U.S. Cl.
CPC .............. *C08L 81/06* (2013.01); *C08L 27/18* (2013.01); *C08L 71/08* (2013.01)

(58) Field of Classification Search
None
See application file for complete search history.

(56) References Cited

U.S. PATENT DOCUMENTS

| | | |
|---|---|---|
| 3,923,726 A | 12/1975 | Benz |
| 4,176,222 A | 11/1979 | Cinderey et al. |
| 4,293,670 A | 10/1981 | Robeson et al. |
| 4,473,684 A | 9/1984 | Maresca et al. |
| 4,503,168 A | 3/1985 | Hartsing, Jr. |
| 5,037,902 A | 8/1991 | Harris et al. |
| 5,134,202 A | 7/1992 | Harris et al. |
| 5,191,305 A | 3/1993 | Frost et al. |
| 5,212,259 A | 5/1993 | Harris et al. |
| 5,521,230 A | 5/1996 | Bhatia et al. |
| 6,482,880 B1 | 11/2002 | Rock |
| 7,652,107 B2 | 1/2010 | Gallucci et al. |
| 7,790,292 B2 | 9/2010 | Colborn et al. |
| 7,932,310 B2 | 4/2011 | Gallucci et al. |
| 8,017,699 B1 | 9/2011 | Sanner et al. |
| 8,034,857 B2 | 10/2011 | Kailasam et al. |
| 2005/0113558 A1 | 5/2005 | Johnson et al. |
| 2005/0159577 A1 | 7/2005 | Davis et al. |
| 2006/0069236 A1 | 3/2006 | Brunelle et al. |
| 2006/0167216 A1 | 7/2006 | Johnson et al. |
| 2007/0027271 A1 | 2/2007 | Davis et al. |
| 2009/0018265 A1 | 1/2009 | Kailasam et al. |

FOREIGN PATENT DOCUMENTS

EP 2366740 A2 9/2011

OTHER PUBLICATIONS

James, Lange's Handbook of Chemistry, 16th ed., McGraw-Hill, 2004, p. 2.778-2.779.
International Search Report for International Application No. PCT/US2012/068485, International Application Filing Date: Dec. 7, 2012; Date of Mailing: Jun. 3, 2013; 4 pages.
Written Opinion for International Application No. PCT/US2012/068485, International Application Filing Date: Dec. 7, 2012; Date of Mailing: Jun. 3, 2013; 4 pages.

*Primary Examiner* — Susannah Chung
*Assistant Examiner* — Robert T Butcher
(74) *Attorney, Agent, or Firm* — Cantor Colburn LLP

(57) ABSTRACT

Disclosed herein is a composition comprising a polyphenylene ether sulfone and a resorcinol based silicone aryl polyester carbonate copolymer wherein greater than or equal to 50 mol % of copolymer repeating units are ester units derived from resorcinol, based on the total molar amount of all repeating units in the polymer and wherein the blend has less than 1 weight percent polycarbonate, based on the total weight of the composition, has FAR 25.853 peak heat release of less than 60 KW/m² and time to peak heat release of greater than or equal to 120 seconds.

28 Claims, No Drawings

BLENDS OF POLYPHENYLENE ETHER SULFONE AND SILICONE POLYESTER CARBONATE

CROSS REFERENCE TO RELATED APPLICATION

This application is a continuation application of U.S. patent application Ser. No. 13/315,507 filed on Dec. 9, 2011, and which is hereby incorporated by reference herein in its entirety.

BACKGROUND

Disclosed herein are blends of polyphenylene ether sulfone and silicone polyester carbonate, methods for making the blends, and articles derived from such blends. The blends have a particularly advantageous combination of properties.

There has long been interest in developing thermoplastic resins that can resist burning. A specific area of concern is in developing plastics for transportation applications, such as rail cars and airplanes. Various evaluation techniques have been developed to test the effectiveness of such materials, for instance Federal Aviation Regulation (FAR) 25.853. In this test, sometimes referred to as the Ohio State University (OSU) rating, the time for a sample to reach peak heat release, the amount of energy released after 2 minutes and the peak heat release energy are measured. Lower peak heat release values and longer time to reach peak heat release are desirable.

Polyphenylene ether sulfones (PPSU) are well known engineering thermoplastics made by condensation polymerization. PPSU resins have good flame resistance, but in terms of the very demanding requirements for large fire resistance, such as in aircraft and rail interiors (for example FAR 25.853 (d)) they do not meet the combined requirements of a 2 minute heat release below 55 kilowatt minutes per square meter (KW-min/m$^2$) and peak heat release below 55 kilowatts per square meter (KW/m$^2$). In other instances a longer time to reach peak heat release (for example greater than 120 seconds) is desired.

The PPSU polymers also have an exceptionally high impact strength without rubber modification, however in many applications such as transportation and electronic applications, their high melt viscosity makes them difficult to mold into large thin walled parts.

For the foregoing reasons, there exists an unmet need for compositions comprising PPSU that have the aforementioned 2 minute heat release, peak heat release properties as well as having sufficiently low melt viscosity to allow molding of large thin walled parts.

BRIEF DESCRIPTION

Disclosed herein is a composition comprising a polyphenylene ether sulfone and a resorcinol based silicone aryl polyester carbonate copolymer wherein greater than or equal to 50 mol % of copolymer repeating units are ester units derived from resorcinol, based on the total molar amount of all repeating units in the polymer and wherein the blend comprises less than 1 weight percent polycarbonate, based on the total weight of the composition. The composition may be free of polycarbonate. The composition has a FAR 25.853 peak heat release of less than or equal to 60 KW/m$^2$ and a time to peak heat release of greater than or equal to 120 seconds. The composition can have a melt volume viscosity rate (MVR) at 300° C. with 6.7 Kg and a six minute equilibration time, as measured by ASTM D1238, of greater than or equal to 1.5 cc/10 minutes. The composition can have a multiaxial impact strength, as measured by ASTM D3763, of greater than or equal to 70 Joules. The composition may have any combination of the aforementioned physical properties.

The above described and other features are exemplified by the following figures and detailed description.

DETAILED DESCRIPTION

As mentioned above, polyphenylene ether sulfones have good flame retardance. However, polyphenylene ether sulfones have a peak heat release greater than 60 KW/m$^2$. Additionally, polyphenylene ether sulfones have a high melt viscosity, which makes it difficult to mold large thin walled parts.

A composition comprising polyphenylene ether sulfone and a specific silicon polyester carbonate resolve the aforementioned issues of polyphenylene ether sulfone. The composition has improved flame retardance and lower melt viscosity compared to polyphenylene ether sulfone.

The composition has a FAR 25.853 peak heat release of less than or equal to 60 KW/m$^2$, or, less than or equal to 55 KW/m$^2$, or, less than or equal to 50 KW/m$^2$. The FAR 25.853 peak heat release can be greater than or equal to 10 KW/m$^2$.

The composition has a FAR 25.853 time to peak heat release of greater than or equal to 120 seconds or, greater than or equal to 130 seconds or, greater than or equal to 140 seconds. The FAR 25.853 time to peak heat release can be less than or equal to 148 seconds.

The composition has a FAR 25.853 2 minute heat release less than or equal to 55 KW-min/m$^2$, less than or equal to 50 KW-min/m$^2$, or, less than or equal to 45 KW-min/m$^2$. The FAR 25.853 2 minute heat release can be greater than or equal to 25 KW-min/m$^2$.

The composition can have a melt volume viscosity rate (MVR) at 300° C. of greater than or equal to 1.5 cubic centimeters per 10 minutes (cc/10 min), or, greater than or equal to 2.0 cc/10 min, or, greater than or equal to 10 cc/10 min. MVR is determined according to ASTM D1238 at 300° C. after six minutes of equilibration time using 6.7 kilograms (kg). Additionally, the composition can have a melt volume viscosity rate (MVR) at 300° C., after 18 minutes of equilibration time, that is less than 1.3 times the MVR at 300° C. after 6 minutes of equilibration time. Stated another way, the composition can have a melt volume viscosity rate (MVR) at 300° C., after 18 minutes of equilibration time, that is less than 30% greater than the MVR at 300° C. after 6 minutes of equilibration time. The composition may have a melt volume viscosity rate (MVR) at 300° C., after 18 minutes of equilibration time that is the same as the MVR at 300° C. after 6 minutes of equilibration time.

The composition can have a multiaxial impact strength greater than or equal to 70 Joules (J), or, greater than or equal to 75 J. Multiaxial impact strength is determined at room temperature (23° C.) according to ASTM D3763.

Polyphenylene ether sulfones comprise repeating units having both an ether linkage and an aryl sulfone linkage in the backbone of the polymer as shown in formula (1)

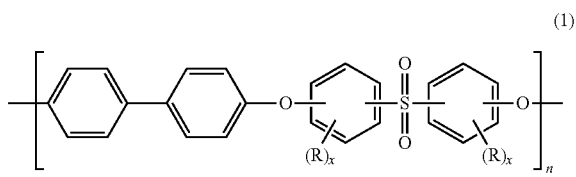

(1)

wherein R is hydrogen, alkyl, aryl, alkyl aryl, alkoxy, halogen or combination thereof, x equals 0 to 4, and n equals 25 to 1000, or, more specifically, n equals 25 to 500, or, more specifically, n equals 25 to 100. The aryl sulfone linkages may be 4,4', 3,3', 3,4' or mixtures thereof. In some embodiments the aryl sulfone linkages are 4,4' diaryl sulfone. In some embodiments greater than or equal to 50 mole percent of the main chain sulfone linkages are derived from biphenol.

An exemplary biphenol polyphenylene ether sulfone is shown in formula (2)

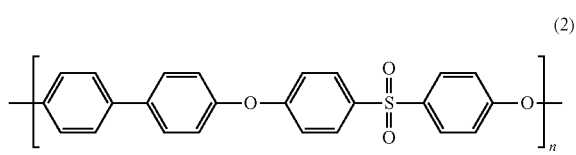

(2)

wherein n is as defined above.

In some embodiments, the polyphenylene ether sulfone is a polyphenylene ether sulfone copolymer of formula (3)

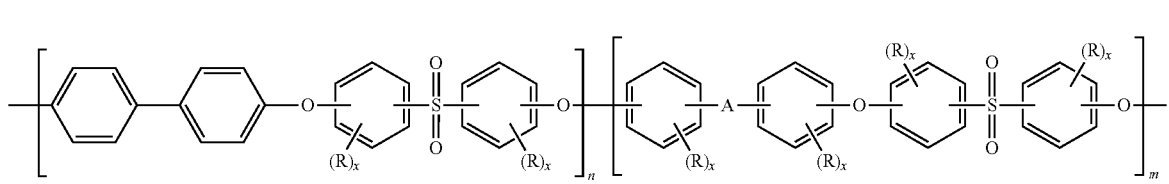

(3)

wherein A is a linking group selected from, —O—, —S—, —SO$_2$—, C$_6$-C$_{18}$ aryl, and C$_3$-C$_{12}$ alkyl. In some embodiments A is isopropylidene. Linkages of A to the aryl groups may be at the 4,4', 3,3', 3,4' positions or mixtures thereof. In many embodiments the linkages are at the 4,4' positions. R and x are defined as above; n>m, and n+m equals 20 to 1000, or, more specifically n+m equals 25 to 500, or, even more specifically, n+m equals 25 to 100. Aryl sulfone linkages may be at the 4,4', 3,3', 3,4' positions or mixtures thereof. In many embodiments the linkages are at the 4,4' positions. In some embodiments the polyphenylene ether sulfones have n equal to 70% and m equal to 30% based on the total of n+m. In some embodiments n equals 80% and m equals 20%, based on the total of n+m.

Exemplary aromatic dihydroxy compounds that can be used to make the polyphenylene ether sulfone copolymers include bisphenols and biphenols such as bisphenol A, dimethyl cyclohexyl bisphenol, dihydroxy diphenyl ether, hydroquinone, methyl hydroquinone and 4,4'-biphenol. Other exemplary aromatic dihydroxy compounds are disclosed in U.S. Patent Publication Nos. 2006/0167216, 2005/0113558, and 2006/0069236.

The polyphenylene ether sulfone can comprise a homopolymer, copolymer, or combination thereof. Copolymers include random copolymers, non-random copolymers and block copolymers.

An example of a polyphenylene ether sulfone copolymer is shown below in formula (4)

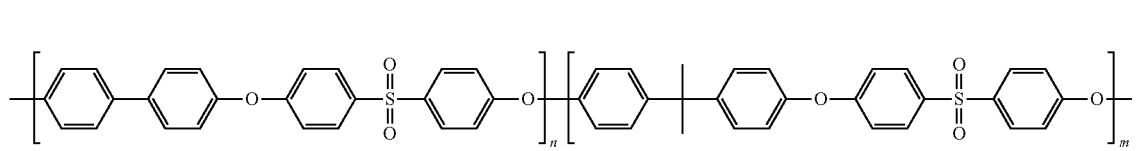

(4)

wherein n>m, n+m=25 to 100, A (from formula (3)) is isopropyl, all aryl linkages are at the 4,4' positions and R (from formula (3)) is hydrogen.

Polyphenylene ether sulfones are commercially available, including the polycondensation product of biphenol with dichloro diphenyl sulfone. An example is PPSU resin is RADEL™ R, available from Solvay, Inc.

Methods for the preparation of polyphenylene ether sulfones are widely known and several suitable processes have been well described in the art. Two methods, the carbonate method and the alkali metal hydroxide method, are known to the skilled artisan. In the alkali metal hydroxide method, a double alkali metal salt of a dihydric phenol is contacted with a dihalobenzenoid compound in the presence of a dipolar, aprotic solvent under substantially anhydrous conditions. The carbonate method, in which a dihydric phenol and a dihalobenzenoid compound are heated, for example, with sodium carbonate or bicarbonate and a second alkali metal carbonate or bicarbonate is also disclosed in the art, for example in U.S. Pat. No. 4,176,222. Alternatively, the polyphenylene ether sulfone may be prepared by any of the variety of methods known in the art including those described in the U.S. Patent Publications referenced above.

The molecular weight of the polyphenylene ether sulfone, as indicated by reduced viscosity data in an appropriate solvent such as methylene chloride, chloroform, N-methylpyrrolidone, or the like, can be greater than or equal to 0.3 dl/g, or, more specifically, greater than or equal to 0.4 dl/g and, typically, will not exceed 1.5 dl/g.

The polyphenylene ether sulfone weight average molecular weight can be 10,000 to 100,000 grams per mole (g/mol) as determined by gel permeation chromatography using ASTM D5296 with polystyrene standards. In some embodiments the polyphenylene ether sulfone weight average molecular weight can be 20,000 to 70,000 grams per mole (g/mol). Polyphenylene ether sulfones may have glass transition temperatures of 180 to 250° C.

The polyphenylene ether sulfone is present in an amount of 70 to 99 weight percent, based on the combined weight of the polyetherimide and the polyphenylene ether sulfone. Within this range the poly polyphenylene ether sulfone may be present in an amount greater than or equal to 80 weight percent.

The resorcinol based silicone aryl polyester carbonate comprises a carbonate unit of formula (5), an ester unit of formula (6), and a siloxane unit of formula (7) or formula (8),

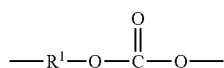  (5)

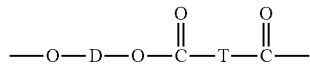  (6)

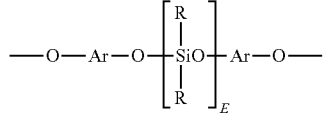  (7)

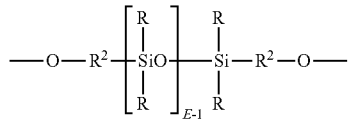  (8)

In the carbonate units of formula (5) greater than or equal to 60 percent of the total number of $R^1$ groups are aromatic organic groups and the balance thereof are aliphatic or alicyclic groups. The aromatic organic groups may be derived from dihydroxy aromatic compounds, including resorcinols or bisphenols. In an embodiment, each $R^1$ is a $C_{6-30}$ arylene group. $R^1$ can be a group of the formula (9):

$$-A^1-Y^1-A^2-$$  (9)

wherein each of $A^1$ and $A^2$ is a monocyclic divalent aryl group and $Y^1$ is a bridging group having one or two atoms that separate $A^1$ from $A^2$. In an exemplary embodiment, one atom separates $A^1$ from $A^2$. Illustrative non-limiting examples of bridging groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ may be a hydrocarbon group or a saturated hydrocarbon group such as methylene, cyclohexylidene, or isopropylidene. $Y^1$ may be a carbon-carbon bond (—) connecting $A^1$ and $A^2$. An example of an $R^1$ of formula (9) that has a carbon-carbon bond connecting $A^1$ and $A^2$ is the group derived from 4,4'-biphenol. In an embodiment, the $R^1$ groups are desirably minimally substituted with hydrocarbon-containing substituents such as, for example, alkyl, alkoxy, or alkylene substituents.

Carbonate units may be produced by the reaction of dihydroxy aromatic compounds having the formula HO—$R^1$—OH, which includes dihydroxy aromatic compounds of formula (10), also referred to herein as a bisphenol:

$$HO-A^1-Y^1-A^2-OH$$  (10)

wherein $Y^1$, $A^1$ and $A^2$ are as described above. Also included are the more specific bisphenol compounds of general formula (11):

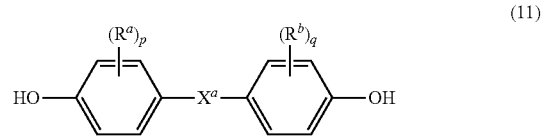  (11)

wherein $R^a$ and $R^b$ each represent a halogen atom or a monovalent hydrocarbon group and may be the same or different; p and q are each independently integers of 0 to 4. It will be understood herein that where no substituent group is specified for an atom, for example where p is 0 in formula (11), the unspecified valency or valencies will be occupied by a hydrogen atom or atoms sufficient to fill the unspecified valency or valencies, unless otherwise specified. Also, in formula (11), $X^a$ represents one of the groups of formula (12).

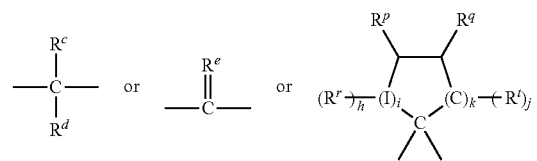  (12)

wherein $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group.

In an embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group.

In another embodiment, $X^a$ is an acyclic $C_{1-18}$ alkylidene group, a $C_{3-18}$ cycloalkylidene group, or a $C_{2-18}$ heterocycloalkylidene group, i.e., a cycloalkylidene group having up to three heteroatoms in the ring, wherein the heteroatoms include —O—, —S—, or —N(Z)—, where Z is hydrogen, halogen, hydroxy, $C_{1-12}$ alkyl, $C_{1-12}$ alkoxy, or $C_{1-12}$ acyl.

Specific examples of the types of bisphenol compounds represented by formula (12) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy aromatic compounds may also be used.

Another aromatic organic group $R^1$ (that is not a bisphenol) is derived from a dihydroxy aromatic compound of formula (13):

(13)

wherein each $R^f$ is independently a halogen atom, a $C_{1-10}$ hydrocarbon group, or a $C_{1-10}$ halogen substituted hydrocarbon group, and u is 0 to 4. The halogen is usually bromine. In an embodiment, compounds of formula (13) in which the —OH groups are substituted meta to one another, and wherein $R^f$ and u are as described above, are also generally referred to herein as resorcinols. Examples of compounds that may be represented by the formula (13) include resorcinol (where u is 0), substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds. In a specific embodiment, compounds of formula (13) are not substituted, with hydrocarbon-containing substituents. In an embodiment, where a dihydroxyaromatic compound of general formula (13) is used, less than or equal to 5 mol %, specifically less than or equal to 2 mol %, and still more specifically less than or equal to 1 mol % of the dihydroxyaromatic compound has alkyl, alkoxy, or alkylene substituents.

In an embodiment, useful carbonate units are derived from bisphenol compounds of formula (10). In a specific embodiment, carbonate units comprise bisphenol-A carbonate repeat units. In another specific embodiment, the copolymer comprises a combination of two or more carbonate units derived from dihydroxy aromatic compounds of formula (10), formula (11), formula (12), and formula (13). In an embodiment, the bisphenol carbonate units comprise 0 to 35 mol %, specifically 1 to 30 mol %, more specifically 2 to 25 mol %, and still more specifically, 3 to 20 mol %, of the total weight of the copolymer composition.

The resorcinol based silicone aryl polyester carbonate also comprises ester units of formula (6)

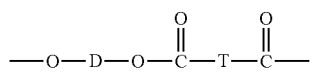

(6)

wherein D is a divalent group derived from a dihydroxy compound, and may be, for example, a $C_{6-20}$ alicyclic group or a $C_{6-20}$ aromatic group; and T is a divalent group derived from a dicarboxylic acid, and may be, for example, a $C_{6-20}$ alicyclic group, a $C_{6-20}$ alkylene-arylene group, or a $C_{6-20}$ arylene group. In a specific embodiment, T is a $C_{6-20}$ arylene group. In an embodiment, D is derived from a dihydroxy aromatic compound comprising formula (10), formula (11), formula (12), formula (13), or a combination comprising at least one of the foregoing dihydroxy aromatic compounds. The D and T groups are desirably minimally substituted with hydrocarbon-containing substituents such as alkyl, alkoxy, or alkylene substituents. In an embodiment, less than 5 mol %, specifically less than or equal to 2 mol %, and still more specifically less than or equal to 1 mol % of the combined number of moles of D and T groups are substituted with hydrocarbon-containing substituents such as alkyl, alkoxy, or alkylene substituents.

Examples of aromatic dicarboxylic acids from which the T group in the ester unit of formula (6) is derived include isophthalic or terephthalic acid, 1,2-di(p-carboxyphenyl) ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 99:1 to 1:99.

The ester units can be as illustrated in formula (14):

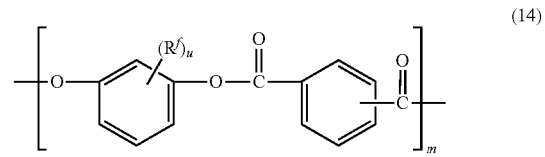

(14)

wherein $R^f$ and u are previously defined for formula (13), and m is greater than or equal to 4. Units of formula (14) are derived from a dihydroxy compound of formula (13) and an isophthalic acid derivative and/or a terephthalic acid derivative. Variable m can be 4 to 50, specifically 5 to 30, more specifically 5 to 25, and still more specifically 10 to 20. Variable m can also be less than or equal to 100, specifically less than or equal to 90, more specifically less than or equal to 70, and still more specifically less than or equal to 50. It will be understood that the low and high endpoint values for m are independently combinable. The molar ratio of isophthalate to terephthalate can be about 0.25:1 to about 4.0:1.

The siloxane unit of formula (7) and formula (8) comprise repeating siloxane units (also referred to herein as "diorganosiloxane units") of formula (15):

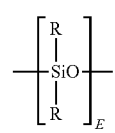

(15)

wherein each occurrence of R is same or different, and is a $C_{1-13}$ monovalent organic group. For example, R may independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups may be fully or partially halogenated with fluorine, chlorine, bromine, or iodine, or a combination thereof. Combinations of the foregoing R groups may be used in the same copolymer. In an embodiment, the polysiloxane comprises R groups that have a minimum hydrocarbon content. In a specific embodiment, an R group with a minimum hydrocarbon content is a methyl group.

The value of E in formula (15) may vary widely depending on the type and relative amount of each component in the thermoplastic composition, the desired properties of the composition, and like considerations. Herein, E has an average value of 5 to 50. E may have an average value of 16 to 50, specifically 20 to 45, and more specifically 25 to 45. E may have an average value of 4 to 15, specifically 5 to 15, more specifically 6 to 15, and still more specifically 7 to 10.

In formula (7) E is as defined above; each R may independently be the same or different, and is as defined above; and each Ar may independently be the same or different, and is a substituted or unsubstituted $C_{6-30}$ arylene group, wherein the bonds are directly connected to an aromatic moiety. Suitable Ar groups in formula (7) may be derived from a $C_{6-30}$ dihydroxy aromatic compound, for example a dihydroxy aromatic compound of formula (10), (11), (12), or (13) above. Combinations comprising at least one of the foregoing dihydroxy aromatic compounds may also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising at least one of the foregoing dihydroxy compounds may also be used. In an embodiment, the dihydroxy aromatic compound is unsubstituted, or is not substituted with non-aromatic hydrocarbon-containing substituents such as, for example, alkyl, alkoxy, or alkylene substituents.

Units of formula (8) may be derived from the corresponding dihydroxy aromatic compound of formula (16):

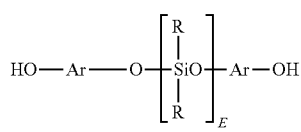

(16)

wherein R, Ar, and E are as described above. In a specific embodiment, where Ar is derived from resorcinol, the polysiloxane has formula (17):

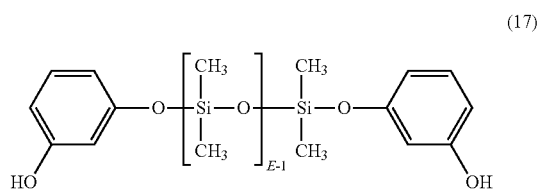

(17)

or, where Ar is derived from bisphenol-A, the polysiloxane has the formula (18)

In formula (8) R and E are as described above, and each occurrence of $R^2$ is independently a divalent $C_{1-30}$ alkylene or $C_{7-30}$ arylene-alkylene. Units of formula (8) may be derived from the corresponding dihydroxy aromatic compound. In a specific embodiment, where $R^2$ is $C_{7-30}$ arylene-alkylene, the units are of formula (19):

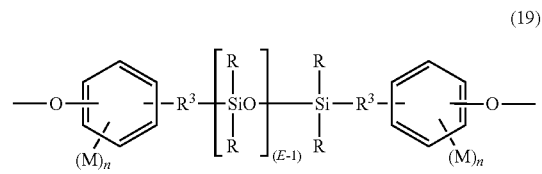

(19)

wherein R and E are as defined above. Each $R^3$ in formula (19) is independently a divalent $C_{2-8}$ aliphatic group. Each M in formula (19) may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein each n is independently 0, 1, 2, 3, or 4.

In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and R is methyl.

Units of formula (19) may be derived from the corresponding dihydroxy polydiorganosiloxanes (20):

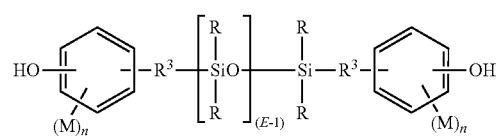

(20)

wherein R, E, M, $R^3$, and n are as described for formula (19).

In a specific embodiment, the dihydroxy polydiorganosiloxane has the structure given in formula (21):

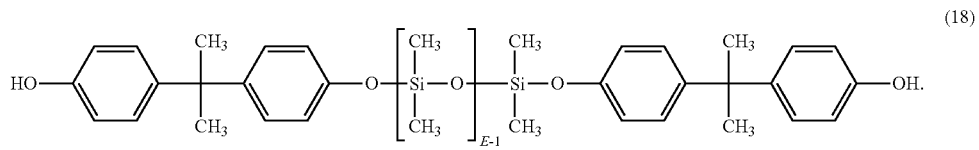

(18)

(21)

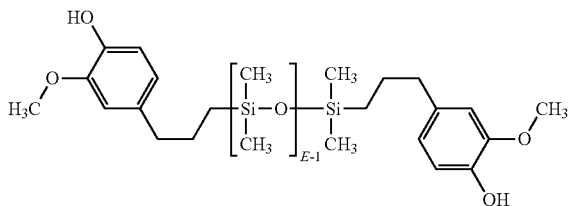

where E is as described above.

In another specific embodiment, the polydiorganosiloxane units are derived from dihydroxy oligodiorganosiloxanes of formula (22):

(22)

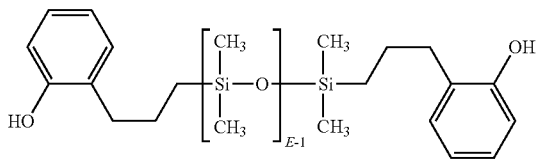

where E is as defined above.

In an embodiment, the copolymer comprises siloxane units in an amount of 0.5 to 20 mol %, specifically 1 to 10 mol % siloxane units, based on the combined mole percentages of siloxane units, ester units, and carbonate units, and provided that siloxane units are provided by polysiloxane units covalently bonded in the polymer backbone of the polysiloxane copolymer composition.

The copolymer comprises siloxane units in an amount of 0.757 to 40 weight percent (wt %), based on the total weight of the copolymer. Within this range, the copolymer can comprise siloxane units in an amount of 0.2 to 10 wt %, specifically 0.2 to 6 wt %, more specifically 0.2 to 5 wt %, and still more specifically 0.25 to 2 wt %, based on the total weight of the copolymer, with the proviso that the siloxane units are provided by siloxane units covalently bonded in the polymer backbone of the copolymer. The siloxane units are sometimes referred to herein as silicone content.

In an embodiment, the copolymer comprises 0.2 to 6 wt % siloxane units, 50 to 99.8 wt % ester units, and 0 to 49.85 wt % carbonate units, wherein the combined weight percentages of the siloxane units, ester units, and carbonate units is 100 wt % of the total weight of the copolymer. In another embodiment, the siloxane copolymer composition comprises 0.25 to 2 wt % siloxane units, 60 to 94.75 wt % ester units, and 3.25 to 39.75 wt % carbonate units, wherein the combined weight percentages of the siloxane units, ester units, and carbonate units is 100 wt % of the total weight of the copolymer.

The resorcinol based silicone aryl polyester carbonate copolymers described herein can be manufactured by different methods such as, for example, solution polymerization, interfacial polymerization, and melt polymerization. These methods are described in U.S. Pat. No. 7,790,292. As appreciated by those of skill in the art, the method of making the copolymer can alter the order of the units as well as the overall architecture (block copolymer or random copolymer). As described above, greater than or equal to 50 mol % of copolymer units are ester units of formula (6) wherein D is derived from resorcinol, based on the total molar amount of all repeating units in the polymer. The amount of copolymer units are ester units of formula (6) wherein D is derived from resorcinol can be greater than or equal to 80 mol %. The amount of copolymer units are ester units of formula (6) wherein D is derived from resorcinol can be less or equal to 90 mol %.

The resorcinol based silicone aryl polyester carbonate can have a weight average molecular weight of 5,000 to 80,000 grams per mole. Resorcinol derived polyester carbonates molecular weight is determined by gel permeation chromatography (GPC) as described in ASTM method D5296 using polycarbonate standards.

The resorcinol based silicone aryl polyester carbonate can comprise 1 to 40 weight percent silicone, based on the total weight of the copolymer.

The composition may comprise 1 to 30 weight percent of the resorcinol based silicone aryl polyester carbonate, based on the total weight of the composition. Within this range the composition may comprise 1 to 20 weight percent of the resorcinol based silicone aryl polyester carbonate. When the resorcinol based silicone aryl polyester carbonate is present in an amount of 1 to 20 weight percent, the composition is transparent and may have a MVR of 2.0 to 30.0 cc/10 min. The MVR is determined with a six minute equilibration time at 300° C. with a 6.7 Kg load using ASTM method D1238. A transparent composition is defined as having a percent transmittance (% T) greater than or equal to 50% and a percent haze (% H) of less than or equal to 10% at 3.2 millimeters (mm) as per ASTM method D1003.

The composition may further comprise a metal oxide, a fluoropolymer, a boron compound, a brominated flame retardant, a c, or a combination of two or more of the foregoing materials.

When present the metal oxide may be present in an amount of 0.01 to 20 percent by weight, based on the total weight of the composition. The metal oxide may comprise a combination of metal oxides. The metal oxides can also comprise silicon atoms and may further have one or more siloxane coatings. The metal oxide may have an average particle size of 3 to 20 micrometers. The metal oxide may comprise titanium dioxide.

Brominated flame retardants may be selected from the group consisting of: brominated polycarbonates, brominated epoxy resins, brominated polystyrenes, brominated aryl acrylates, brominated phthalimides, for example tetrabromo phthalimides, and mixtures thereof.

Exemplary fluoropolymers include a polytetrafluoroethylene (PTFE), for example as described in U.S. Pat. No. 5,521,230 as an antidrip agent.

Exemplary boron compounds include metal borates, boric acid, borate esters, boron oxides, and other oxygen compounds of boron.

Other optional additives include antioxidants such as phosphites, phosphonites, and hindered phenols. Phosphorus containing stabilizers include triaryl phosphites, aryl phosphonates, as well as difunctional phosphorus containing compounds. Phosphorus containing stabilizers are typically present in the composition at 0.001 to about 2% by weight of the entire formulation. Colorants, light stabilizers, optical brighteners, UV absorbers, flow aids, and mold release compounds are also contemplated. Mold release agents are typically present in the composition at 0.05 to about 0.5% by weight of the formulation. Examples of mold release agents are alkyl carboxylic acid esters, for example, penta erythritol tetrastearate, glycerin tristearate, and ethylene glycol distearate. Preferred mold release agents will have high molecular weight, typically greater than about 200, to prevent loss of the release agent from the molten polymer mixture during melt processing.

The compositions may, optionally, further comprise a reinforcing filler. Suitable reinforcing fillers include silica; glass spheres or flakes, silicates such as talc, clay, wollastonite or mica; carbon black; and reinforcing fibers, such as carbon fiber, glass fiber, and the like; and mixtures comprising at least one of the foregoing fillers. In other embodiments, the reinforcing filler comprises glass fibers. For compositions ultimately employed for electrical uses, it is preferred to use fibrous glass fibers comprising lime-aluminum borosilicate glass that is relatively soda free, commonly known as "E" glass. The diameter of the glass fibers is generally 1 to 50 micrometers, preferably 9 to 15 micrometers. In preparing the molding compositions, it is convenient to use the filamentous glass in the form of chopped strands of one-eighth to 2 inches long, which usually results in filament lengths between 0.0005 to 0.25 inch (0.0127 and 6.35 mm) in the molded compounds. Such glass fibers are normally supplied by the manufacturers with a surface treatment compatible with the polymer component of the composition, such as a siloxane, titanate, or polyurethane sizing, or the like.

The thermoplastic composition can be prepared by melt mixing or a combination of dry blending and melt mixing. Melt mixing can be performed in single or twin screw type extruders or similar mixing devices that can apply a shear and heat to the components. Melt mixing can be performed at temperatures greater than or equal to the melting temperatures of the resorcinol based silicone aryl polyester carbonate and polyphenylene ether sulfone and less than the degradation temperatures of any of the components of the composition. In some embodiments suitable melt mixing is achieved at a temperature of 125 to 150° C. above the highest glass transition temperature of the two polymers.

All of the ingredients may be added initially to the processing system. In some embodiments, the ingredients may be added sequentially or through the use of one or more master batches.

The compositions described above can be used to make articles (including portions of articles). Exemplary articles include, aircraft interior panels, railcar interior panels, serving trays, luggage bins, window trim, serving carts and the like. Articles can also comprise films, fibers electrical conduits, connector, sheets, tubes, and hollow containers. Films can be single or multilayer films and can be used to coat or cover other substrates. Articles can be made by any suitable method, e.g., injection molding, compression molding, sintering, thermoforming, blow molding, profile extrusion, melt spinning, gas assist molding, foam molding, rotomolding, solvent casting, and the like.

Examples

The compositions are further described by the following non-limiting examples. Numbers designate examples of the invention, comparative examples are shown by letters.

A sample of PPSU, Radel 5100 NT from Solvay Co. was melt processed on a twin screw extruder with 10 to 75 wt % FST silicone copolyester carbonate. The materials used in the experiments are shown in Table 1. Blends, shown in the Table 2, were shaken on a paint shaker for approximately 3 minutes prior to extrusion. Extrusion was done in a vacuum vented 2 lobe 30 millimeter (mm) WP extruder with a mixing screw, at a barrel set temperature between 270 and 320° C. and 300 rotations per minute (rpm) screw speed. Resin blends were not pre-dried. The extrudate was cooled through a water bath prior to pelletizing. Resin pellets were dried at 125° C. for at least 3 hours and injection molded.

Heat release testing was done on 6×6 inch plaques 60 mils thick using the Ohio State University (OSU) rate-of-heat release apparatus, as measured by the method listed in FAR 25.853. Heat release was measured at two minutes in kW-min/m². The peak heat release was measured as KW/m². The time to maximum heat release, in minutes, was also measured. The heat release test method is also described in the "Aircraft Materials Fire Test Handbook" DOT/FAA/AR-00/12, Chapter 5 "Heat Release Test for Cabin Materials".

Properties were measured using ASTM test methods. Melt flow rate (MFR) was run on dried pellets as per ASTM D1238 at 300° C. using a 6.7 kilogram weight after a 6 or 18 minute equilibration. All molded samples were conditioned for at least 48 hours at 50% relative humidity prior to testing. Multiaxial impact (MAI) was measured in 4×⅛ inch molded discs as per ASTM D3763.

TABLE 1

| Material Description | Source |
|---|---|
| RADEL R5100 Polyphenylene Ether Sulfone (PPSU), Mw approximately 51,500 (GPC, PS standards), Tg = 224° C. | Solvay Co. |
| FST resin has about 80 mole % resorcinol ester linkages, 8 mole % resorcinol carbonate linkages, 10 mole % bisphenol A carbonate linkages, and 1 mole % of a D10 eugenol capped dimethyl siloxane. Tg = 130° C., Mw approximately 25,000 (GPC PC standards) | SABIC Innovative Plastics |

Table 2 shows PPSU blends with 10, 25, 50, and 75% of a FST silicone polyester carbonate copolymer. The examples of the invention (1 to 4) show a lower peak heat release (37 to 56 KW/m²) than the PPSU control (example A) which has a 63 KW/m² value. Lower levels (10 to 25 wt %) of FST in examples 2 and 3 show the lowest 2 minute and peak heat release values.

The examples of the invention also have a longer time to reach peak heat release, from 38 to 82% greater than the control A.

Blends of examples 1 to 4 all have increased melt flow (6 min. MVR from 2.1 to 17.4 cc/10 min.) compared to the PPSU (control A) melt flow of 1.3 cc/10 min. The MVR after 18 minutes at 300° C. shows little change from the 6 minute values indicating good blend stability at processing temperature.

Examples 1 to 4 also show a glass transition temperature (Tg) above 200° C. Tg was determined using differential scanning calorimetry (DSC) measured as per ASTM D3418 using a 20° C. heating rate. Tg was recorded on the second heat. Multiaxial impact (MAI) values, as measured by ASTM D3763, are above 70 Joules (J). All samples showed ductile failure at 23° C. At 10% FST the PPSU blend of example 1 is miscible with only 8.8% haze and a transmittance at 3.2 mm (% T) of over 50% as per ASTM method D1003. At 25 wt % or greater FST the PPSU blends of examples 2 to 4 are opaque with a low % T.

TABLE 2

| Examples | A | 1 | 2 | 3 | 4 |
|---|---|---|---|---|---|
| Composition (wt %) | 100 PPSU | 90:10 PPSU:FST | 75:25 PPSU:FST | 50:50 PPSU:FST | 25:75 PPSU:FST |
| Part Appearance | clear | clear | opaque | opaque | opaque |

TABLE 2-continued

| Examples | A | 1 | 2 | 3 | 4 |
|---|---|---|---|---|---|
| % T 3.2 mm | 62.3 | 53.0 | 8.6 | 3.9 | 12.2 |
| % H 3.2 mm | 3.6 | 8.8 | 99 | 99 | 99 |
| MVR 6 min 300° C. cc/10 min 6.7 Kg | 1.3 | 2.1 | 3.6 | 11.2 | 17.4 |
| MVR 18 min 300° C. | 1.3 | 2.2 | 3.9 | 13.1 | 18.4 |
| Tg1 DSC ° C. (20° C./min) | 223.8 | 209.2 | 213.2 | 212.7 | 213.4 |
| Tg2 DSC ° C. | none | none | 138.4 | 140.7 | 141.2 |
| MAI Total Energy J (all 100% ductile) | 86.2 | 82.1 | 73.5 | 75.9 | 77.9 |
| FAA Heat Release (6 × 6 × 60 mil) | | | | | |
| 2 min. heat relase (KW-min/m$^2$) | 38 | 31 | 33 | 41 | 38 |
| Peak heat release(KW/m$^2$) | 63 | 39 | 37 | 56 | 46 |
| Seconds to peak heat release | 107 | 148 | 172 | 155 | 195 |
| % increase in time to peak release | n/a | 38.3% | 60.7% | 44.9% | 82.2% |

Table 3 shows further characterization of improved melt flow of the FST-PPSU blends in a measurement of viscosity vs. shear rate (l/sec.) at 330° C. showing lower viscosities (measured in Pa-s) at shear rates of 29 to 3007 l/sec. for the PPSU-FST blends of examples 1 to 4, compared to the PPSU control A. Viscosity vs. shear rate was measured as per ASTM D3835.

TABLE 3

| | | Example | | |
|---|---|---|---|---|
| A | 1 | 2 | 3 | 4 |
| | | Composition | | |
| Shear Rate (1/sec.) | 100 PPSU | 90:10 PPSU:FST | 75:25 PPSU:FST | 50:50 PPSU:FST2 | 5:75 PPSU:FST |
| | | Shear Viscosity (Pa-s) 330° C. | | |
| 29 | 5471 | 4398 | 3063 | 1339 | 706 |
| 50 | 5732 | 4207 | 2704 | 1030 | 774 |
| 97 | 4493 | 3563 | 2320 | 969 | 780 |
| 203 | 3479 | 2572 | 1647 | 782 | 616 |
| 300 | 2858 | 2108 | 1413 | 740 | 592 |
| 500 | 2074 | 1595 | 1145 | 627 | 528 |
| 640 | 1781 | 1364 | 1002 | 578 | 495 |
| 1002 | 1356 | 1024 | 796 | 488 | 421 |
| 1503 | 1011 | 788 | 642 | 406 | 354 |
| 3007 | 635 | 520 | 410 | 285 | 248 |

Table 3 shows the improvement in melt flow at 330° C. for the FST blends, examples 1 to 4, compared to the PPSU control (example A). At every shear rate from 29 to 3007 l/sec., examples 1 to 4 show a lower melt viscosity, measured in Pascal seconds (Pa-s), than comparative example A. As the level of FST increases the improvement (reduction) in viscosity is more pronounced. Lower viscosity will make it easier to fill large thin molded parts with complex geometries. Lower viscosity can also reduce the temperature at which a melt is processed often avoiding decomposition. Even with only 10% FST there is a significant improvement in melt flow (reduction in viscosity). The range of shear rates from 29 to 3007 l/sec. encompasses the various different shear rates encountered in many melt forming processes such as injection molding, blow molding, and extrusion.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). "Combination" is inclusive of blends, mixtures, alloys, reaction products, and the like. Furthermore, the terms "first," "second," and the like, herein do not denote any order, quantity, or importance, but rather are used to d one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. An article comprising a thermoplastic composition, wherein the article is a rail car interior article or an airplane interior article and the thermoplastic composition consists of 70 to 99 wt % of a polyphenylene ether sulfone, 1 to 30 wt % of a resorcinol based silicone aryl polyester carbonate copolymer, based on the total weight of the composition, and optionally a metal oxide, fluoropolymer, boron compound, brominated flame retardant, antioxidant, colorant, light stabilizer, optical brightener, UV absorber, flow aid, mold release agent, reinforcing filler, or a combination thereof, wherein greater than or equal to 50 mol % of resorcinol based silicone aryl polyester carbonate copolymer repeating units are ester units derived from resorcinol, based on the total molar amount of all repeating units in the polymer and wherein the blend comprises less than 1 weight percent polycarbonate, based on the total weight of the composition, and the composition has a FAR 25.853 peak heat release of less than 50 KW/m$^2$, a time to peak heat release of greater than or equal to 120 seconds, and a melt volume viscosity rate (MVR) at 300° C. using a six minute equilibration time, with 6.7 Kg, as measured by ASTM D1238, of greater than or equal to 2.0 cc/10 minutes.

2. The article of claim 1, wherein the composition has a multiaxial impact strength, as measured by ASTM D3763, of greater than or equal to 70 Joules.

3. The article of claim 1, wherein greater than or equal to 80 mol % of copolymer repeating units are ester units derived from resorcinol, based on the total molar amount of all repeating units in the polymer and wherein the blend has a time to peak heat release of greater than or equal to 140 seconds.

4. The article of claim 1, wherein the polyphenylene ether sulfone is present in an amount of 80 to 99 wt % and the resorcinol based silicone aryl polyester carbonate copolymer is present in an amount of 1 to 20 wt %, based on the total weight of the composition.

5. The article of claim 4, wherein the article has a percent transmittance (% T) greater than or equal to 50% and a percent haze of less than or equal to 10% at 3.2 millimeters as per ASTM method D1003.

6. The article of claim 1, wherein the resorcinol based silicone aryl polyester carbonate copolymer has a weight average molecular weight (Mw) of 5,000 to 80,000 daltons.

7. The article of claim 1, wherein the resorcinol based silicone aryl polyester carbonate copolymer has a silicone content of 1 to 40 wt %, based on the total weight of the copolymer and the copolymer comprises a siloxane unit of formula (15)

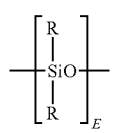

wherein R is methyl and E has an average value of 5 to 50.

8. The article of claim 1, wherein the polyphenylene ether sulfone comprises repeating units of formula (1)

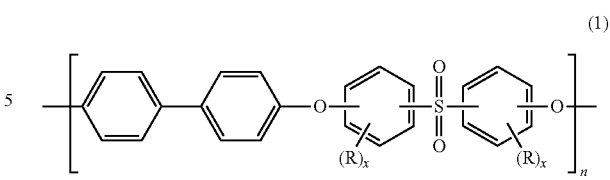

wherein R is hydrogen, alkyl, aryl, alkyl aryl, alkoxy, halogen or combination thereof, x equals 0 to 4, and n equals 25 to 1000.

9. The article of claim 1, wherein the polyphenylene ether sulfone has a weight average molecular weight of 20,000 to 70,000 g/mol.

10. The article of claim 1, wherein the composition has a melt volume viscosity rate (MVR) at 300° C., using a six minute equilibration time, with 6.7 Kg, as measured by ASTM D1238, that is greater than or equal to 1.5 cc/10 minutes and wherein the melt viscosity rate, using an eighteen minute equilibration time at 300° C. with 6.7 Kg, is less than 30% higher than the 6 minute MVR value.

11. The article of claim 1, wherein the resorcinol based silicone aryl polyester carbonate copolymer comprises a siloxane unit of formula (19)

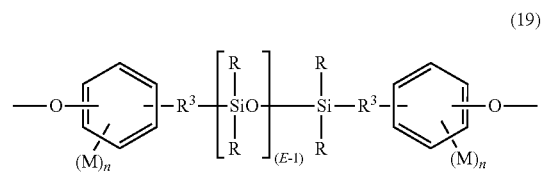

wherein each R independently is a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group, E has an average value of 5 to 50, each $R^3$ is independently a divalent $C_{2-8}$ aliphatic group, each M is independently a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, and each n is independently 0, 1, 2, 3, or 4.

12. The article of claim 11, wherein n is 0 and $R^3$ is a $C_3$ aliphatic group.

13. The article of claim 11, wherein n is 1, M is $C_{1-8}$ alkoxy, and $R^3$ is a $C_3$ aliphatic group.

14. The article of claim 1, wherein the article is an aircraft interior panel or a railcar interior panel.

15. A composition consisting of 70 to 99 wt % of a polyphenylene ether sulfone and 1 to 30 wt % of a resorcinol based silicone aryl polyester carbonate copolymer, based on the total weight of the composition, and optionally a metal oxide, fluoropolymer, boron compound, brominated flame retardant, antioxidant, colorant, light stabilizer, optical brightener, UV absorber, flow aid, mold release agent, reinforcing filler, or a combination thereof, wherein greater than or equal to 50 mol % of resorcinol based silicone aryl polyester carbonate copolymer repeating units are ester units derived from resorcinol, based on the total molar amount of all repeating units in the polymer and wherein the blend comprises less than 1 weight percent polycarbonate, based on the total weight of the composition, and the composition has a FAR 25.853 peak heat release of less than 50 KW/m², a time to peak heat release of greater than or equal to 120 seconds, and a melt volume viscosity rate (MVR) at 300° C. using a six minute equilibration time, with 6.7 Kg, as measured by ASTM D1238, of greater than or equal to 2.0 cc/10 minutes.

16. The composition of claim 15, wherein the composition has a multiaxial impact strength, as measured by ASTM D3763, of greater than or equal to 70 Joules.

17. The composition of claim 15, wherein greater than or equal to 80 mol % of copolymer repeating units are ester units derived from resorcinol, based on the total molar amount of all repeating units in the polymer and wherein the blend has a time to peak heat release of greater than or equal to 140 seconds.

18. The composition of claim 15, wherein the polyphenylene ether sulfone is present in an amount of 80 to 99 wt % and the resorcinol based silicone aryl polyester carbonate copolymer is present in an amount of 1 to 20 wt %, based on the total weight of the composition.

19. The composition of claim 15, wherein the article has a percent transmittance (% T) greater than or equal to 50% and a percent haze of less than or equal to 10% at 3.2 millimeters as per ASTM method D1003.

20. The composition of claim 15, wherein the resorcinol based silicone aryl polyester carbonate copolymer has a weight average molecular weight (Mw) of 5,000 to 80,000 daltons.

21. The composition of claim 15, wherein the resorcinol based silicone aryl polyester carbonate copolymer has a silicone content of 1 to 40 wt %, based on the total weight of the copolymer and the copolymer comprises a siloxane unit of formula (15)

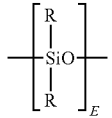

(15)

wherein R is methyl and E has an average value of 5 to 50.

22. The composition of claim 15, wherein the polyphenylene ether sulfone comprises repeating units of formula (1)

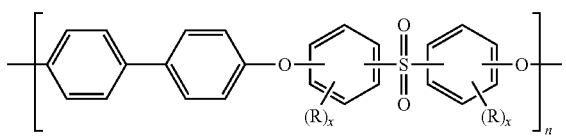

(1)

wherein R is hydrogen, alkyl, aryl, alkyl aryl, alkoxy, halogen or combination thereof, x equals 0 to 4, and n equals 25 to 1000.

23. The composition of claim 15, wherein the polyphenylene ether sulfone has a weight average molecular weight of 20,000 to 70,000 g/mol.

24. The composition of claim 15, wherein the composition has a melt volume viscosity rate (MVR) at 300° C., using a six minute equilibration time, with 6.7 Kg, as measured by ASTM D1238, that is greater than or equal to 1.5 cc/10 minutes and wherein the melt viscosity rate, using an eighteen minute equilibration time at 300° C. with 6.7 Kg, is less than 30% higher than the 6 minute MVR value.

25. The composition of claim 15, wherein the resorcinol based silicone aryl polyester carbonate copolymer comprises a siloxane unit of formula (19)

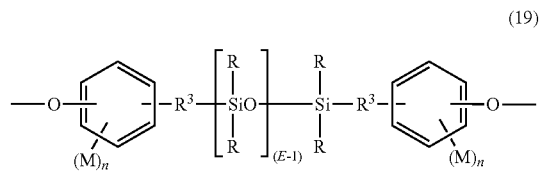

(19)

wherein each R independently is a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group, E has an average value of 5 to 50, each $R^3$ is independently a divalent $C_{2-8}$ aliphatic group, each M is independently a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, and each n is independently 0, 1, 2, 3, or 4.

26. The composition of claim 25, wherein n is 0 and $R^3$ is a $C_3$ aliphatic group.

27. The composition of claim 25, wherein n is 1, M is $C_{1-8}$ alkoxy, and $R^3$ is a $C_3$ aliphatic group.

28. A composition consisting of 80 to 99 weight percent of a polyphenylene ether sulfone; 1 to 20 weight percent of a resorcinol based silicone aryl polyester carbonate copolymer wherein greater than or equal to 80 mol % of copolymer repeating units are ester units derived from resorcinol, based on the total molar amount of all repeating units in the polymer; 0.001 to about 2 weight percent of a phosphorus containing stabilizers; and 0 to 20 weight percent of a metal oxide, wherein weight percent is based on the total weight of the composition.

* * * * *